April 9, 1957
A. C. STADTHAUS
2,788,232
FLEXIBLE WELDED SPUT
Filed June 3, 1954
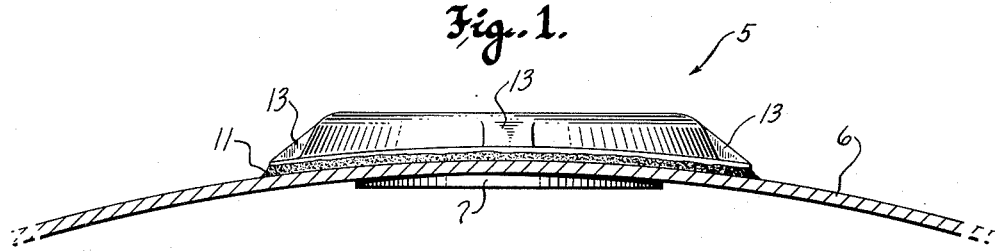
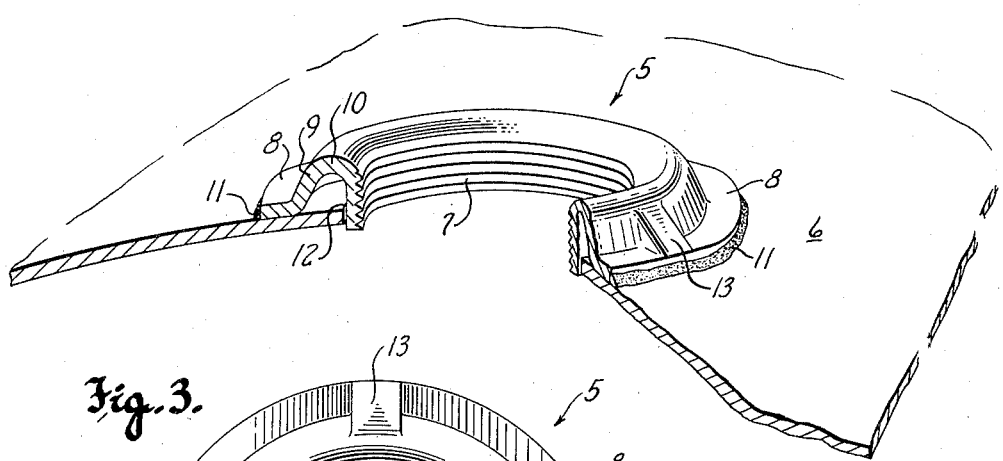
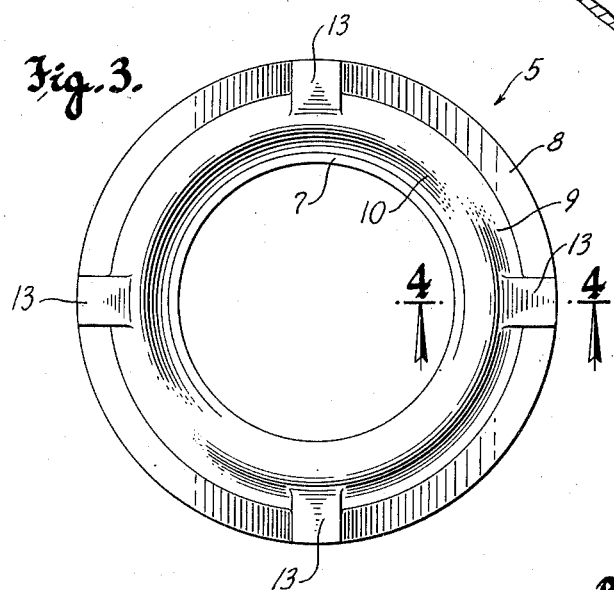
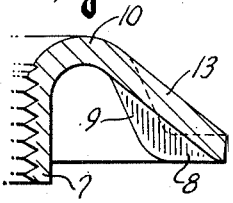
Inventor
Alfred C. Stadthaus

United States Patent Office 2,788,232
Patented Apr. 9, 1957

2,788,232

FLEXIBLE WELDED SPUT

Alfred C. Stadthaus, Mayville, Wis., assignor to Mayville Metal Products Co., Mayville, Wis., a corporation of Wisconsin Application June 3, 1954, Serial No. 434,145

1 Claim. (Cl. 285—201)

This invention relates to pipe flanges and refers more particularly to a pipe flange especially designed for the connection of pipes in the walls of tanks and the like, as for instance, the inlet or outlet pipes of oil tanks. Flanges of this type are usually welded to the tank wall and the pipe flange of this invention is likewise intended to be secured in place by welding.

Heretofore such pipe flanges have been made either as drop forgings or as sheet metal stampings. The stamped flanges of course have the advantage of low cost, but in addition are more readily secured in place. Unlike the drop forged flanges, they may be arc welded, gas welded or silver soldered to a tank wall without precleaning.

However, the stamped pipe flanges heretofore available were likely to be warped, or at least objectionably stressed during the welding thereof to a tank or other wall. The stamped flanges heretofore available also shared the disadvantage of the drop forged flanges of being unable to accommodate even the slightest misalignment between the pipe and the tank wall.

The present invention overcomes these disadvantages of the previously available stamped pipe flanges and hence has as its purpose and object to provide an improved pipe flange which combines the inherent advantages of a stamped sheet metal fitting with assurance against distortion resulting from the heat of welding and sufficient flexibility to accommodate at least slight misalignment between a tank opening and a pipe line to be connected thereto.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof, and in which:

Figure 1 is a cross sectional view through a tank wall illustrating a pipe flange of this invention secured thereto;

Figure 2 is a perspective view of the assembled pipe flange and tank wall with parts broken away and in section to illustrate structural details;

Figure 3 is a top view of the pipe flange per se, and

Figure 4 is a cross sectional view through Figure 3 on the plane of the line 4—4.

Referring now particularly to the accompanying drawing, the numeral 5 designates generally the pipe flange of this invention and which as hereinbefore noted is adapted to be welded to the wall 6 of a tank or other receptacle. The pipe flange 5 is one integral sheet metal stamping and comprises a cylindrical pipe receiving sleeve 7, an attaching flange 8 and a skirt portion 9 which connects the sleeve 7 with the attaching flange.

The sleeve 7 is internally threaded to receive a pipe (not shown) and is substantially smaller in diameter than the inside diameter of the attaching flange 8. Accordingly, the attaching flange 8 is spaced radially outwardly from the sleeve.

The skirt portion 9 is generally conical and has its large diameter end joined to the inner edge of the attaching flange 8 and its small diameter end connected to one end of the sleeve 7 by an inwardly curled bend 10. Accordingly, the attaching flange 8 is opposite or encircles the unattached or free end portion of the sleeve 7, and as will be readily apparent, the bend 10 affords a degree of resilience or flexibility which enables the sleeve 7 to have limited angular motion with respect to the attaching flange to thereby accommodate small misalignments between a pipe line and the tank wall to which it is connected.

This construction has the further advantage of more or less isolating the sleeve 7 from the stresses inevitably set up in the attaching flange 8 by the heat applied during the welding of the flange to a tank wall. Thus, though the attaching flange 8 may be somewhat warped during the formation of the weld 11, the roundness of the sleeve 7 will not be destroyed. The hole 12 in the tank wall which the pipe flange encircles should be sufficiently larger in diameter than the sleeve 7 so as not to restrict possible angular movement of the sleeve if this becomes necessary to accommodate slight misalignment between the tank and the pipe line secured thereto by the flange.

The pipe flange illustrated in the drawing has its attaching flange 8 shaped to accommodate a convexly curved tank wall, but as will be readily apparent, the attaching flange 8 may be shaped to accommodate a concavely curved tank wall or a flat wall.

The strength of the fitting is desirably increased through the provision of a plurality of circumferentially spaced diagonal reinforcing ribs 13. These ribs extend across the junction between the skirt portion 9 and the attaching flange 8 and are formed during the stamping operation.

From the foregoing description taken in connection with the accompanying drawing, it will be readily apparent that this invention provides a pipe flange which possesses many advantages over flanges of this character heretofore available.

What is claimed as my invention is:

In combination: a metal container wall having a round hole therein; a pipe flange comprising a unitary sheet metal stamping having an internally threaded cylindrical sleeve, the outside diameter of which is considerably smaller than that of the hole in the wall, an attaching flange encircling the sleeve and spaced a substantial distance therefrom, said attaching flange having surface to surface engagement with said wall over a substantial area thereof and with the sleeve in line with the hole in the wall, a substantially conical skirt joining the attaching flange with one end of the sleeve and securing said parts together with the opposite end of the sleeve projecting a substantial distance below the underside of the attaching flange and into the hole in the wall, the junction of the skirt with the sleeve being in the form of a return bend of sufficient resilience to yield in the presence of shape deforming stresses set up in the attaching flange during securement thereof to the wall and thereby prevent such stresses being manifested in the sleeve, circumferentially spaced apart stiffening ribs extending across the junction of the skirt and attaching flange, said ribs having their outer extremities substantially tangent to the bend which joins the skirt and sleeve; and welding securing the attaching flange to the wall; the space between the sleeve and the surrounding edge of the hole and the resilience of the bend which joins the sleeve and skirt assuring against deformation of the sleeve as a result of any warping which might take place during the securement of the attaching flange to the wall, and also enabling the sleeve to be shifted angularly to accommodate slight misalignment between the wall and a pipe to be secured to the wall by threaded engagement into the sleeve.

References Cited in the file of this patent

UNITED STATES PATENTS

| | | |
|---|---|---|
| Re. 17,827 | Wikstrom | Oct. 14, 1930 |
| 1,211,486 | Pickop | Jan. 9, 1917 |
| 1,915,300 | Draper | June 27, 1933 |
| 2,199,527 | Sebell | May 7, 1940 |